United States Patent [19]
Matsushima

[11] Patent Number: 5,272,687
[45] Date of Patent: Dec. 21, 1993

[54] EFM SIGNAL COMPENSATION CIRCUITRY

[75] Inventor: Yukio Matsushima, Musashino, Japan

[73] Assignee: Kabushiki Kaisha Kenwood, Tokyo, Japan

[21] Appl. No.: 824,141

[22] Filed: Jan. 22, 1992

[30] Foreign Application Priority Data

Jan. 30, 1991 [JP] Japan .................. 3-014106[U]

[51] Int. Cl.$^5$ ............................................. G11B 20/16
[52] U.S. Cl. ..................................................... 369/59
[58] Field of Search .................... 360/32, 51; 358/335; 369/124, 59

[56] References Cited
U.S. PATENT DOCUMENTS 4,669,004 5/1987 Moon et al. ............... 360/77.08
4,956,720 9/1990 Tomisawa ...................... 369/59

Primary Examiner—Donald E. McElheny, Jr.
Attorney, Agent, or Firm—Sixbey, Friedman, Leedom & Ferguson

[57] ABSTRACT

The symmetry apparatus which allows not only to control the timings of all EFM data signals, but also to control the timing of only a particular EMF data signal. A detector detects a particular EMF data signal having a particular channel bit rate from input EMF data signals. Using a clock delayed by a time period required for the detection operation of the detector and a clock delayed from the particular data by a predetermined time period, only the particular data is delayed by the predetermined time period. It is therefore possible to control the timing of only the particular EMF data signal differently from the other EMF data signals.

1 Claim, 2 Drawing Sheets

EFM SIGNAL COMPENSATION CIRCUITRY

BACKGROUND OF THE INVENTION

1. Field of the Invention

The present invention relates to a EFM signal compensation apparatus, and more particularly to a such apparatus for controlling the timing of an EFM signal to be recorded on an optical disk.

2. Description of Related Background Art

In forming a pit pattern by applying a laser beam to a recording medium such as an optical disk, the laser beam is controlled by an EFM signal Eight-to-Fourteen modulated by recording information.

The length of a pit formed on an optical disk by applying a laser beam changes with the diameter of the laser beam, the response characteristics of the recording medium, and the like. Therefore, a reproduced signal of a pit contains error components. To reproduce a correct signal, it is therefore necessary to finely adjust a time period during which a laser beam is applied in forming a pit. Such fine adjustment is performed using a EFM signal compensation apparatus which finely controls the timing of an EFM signal.

A conventional EFM compensation apparatus of this kind has a circuit configuration such as shown in FIG. 3.

In FIG. 3, a EFM compensation circuit 21 is constructed of, e.g., a shift register of multiple stage subordination structure having an output tap at each stage, the register being driven by input clocks. An output tap designated by a control signal from a control unit 22 is selected. An output EFM signal whose timing has been controlled by an amount corresponding to the selected output tap, is then obtained.

The conventional EFM compensation apparatus described above adjusts the delay time of the EFM signal by the amount specified by the control signal.

Read/write and other operations of an optical disk are presently defined by the standards stipulated by a so-called Orange Book which is substantially international standard formats. In some cases, such as timing adjustment of only particular EFM data, it becomes necessary to change the standards.

For example, the timings of all EFM data signals including 3T to 11T, T representing a so-called channel bit rate corresponding to the transmission rate, having been adjusted uniformly by the predetermined time period.

However, the length of a pit formed by 3T data is relatively short and its reproduced signal is low level, degrading the quality of whole reproduced signals. There arises a need of new standards including timing adjustment of only particular data (e.g., 3T data) differently from other data.

However, although the above-described conventional EFM compensation apparatus can control the timings of all EFM data signals uniformly, it cannot control the timing of a particular EFM data signal differently from other EFM data signals.

SUMMARY OF THE INVENTION

It is an object of the present invention to provide a EFM compensation apparatus capable of controlling the timing of particular EFM data differently from other EFM data.

The above problems can be solved by the EFM compensation apparatus of the present invention, which comprises:

a detector circuit for detecting particular data having a particular channel bit rate from an EFM signal;

a first delay circuit for delaying a clock by a first time period corresponding to a detection time delay caused by the detector circuit;

a second delay circuit for delaying the clock from the particular data by a predetermined second time period; and a EFM compensation circuit for controlling the timing of only the particular data by the second time period in accordance with output clocks from the first and second delay circuits.

According to the present invention, the detector detects a particular EMF data signal having a particular channel bit rate from input EMF data signals. Using a clock delayed by a time period required for the detection operation of the detector and a clock delayed from the particular data by a predetermined time period, only the particular data is delayed by the predetermined time period. It is therefore possible to control the timing of only the particular EMF data signal differently from the other EMF data signals.

DESCRIPTION OF THE PREFERRED EMBODIMENT

An embodiment of the present invention will be described with reference to the accompanying drawings.

Figure 1:
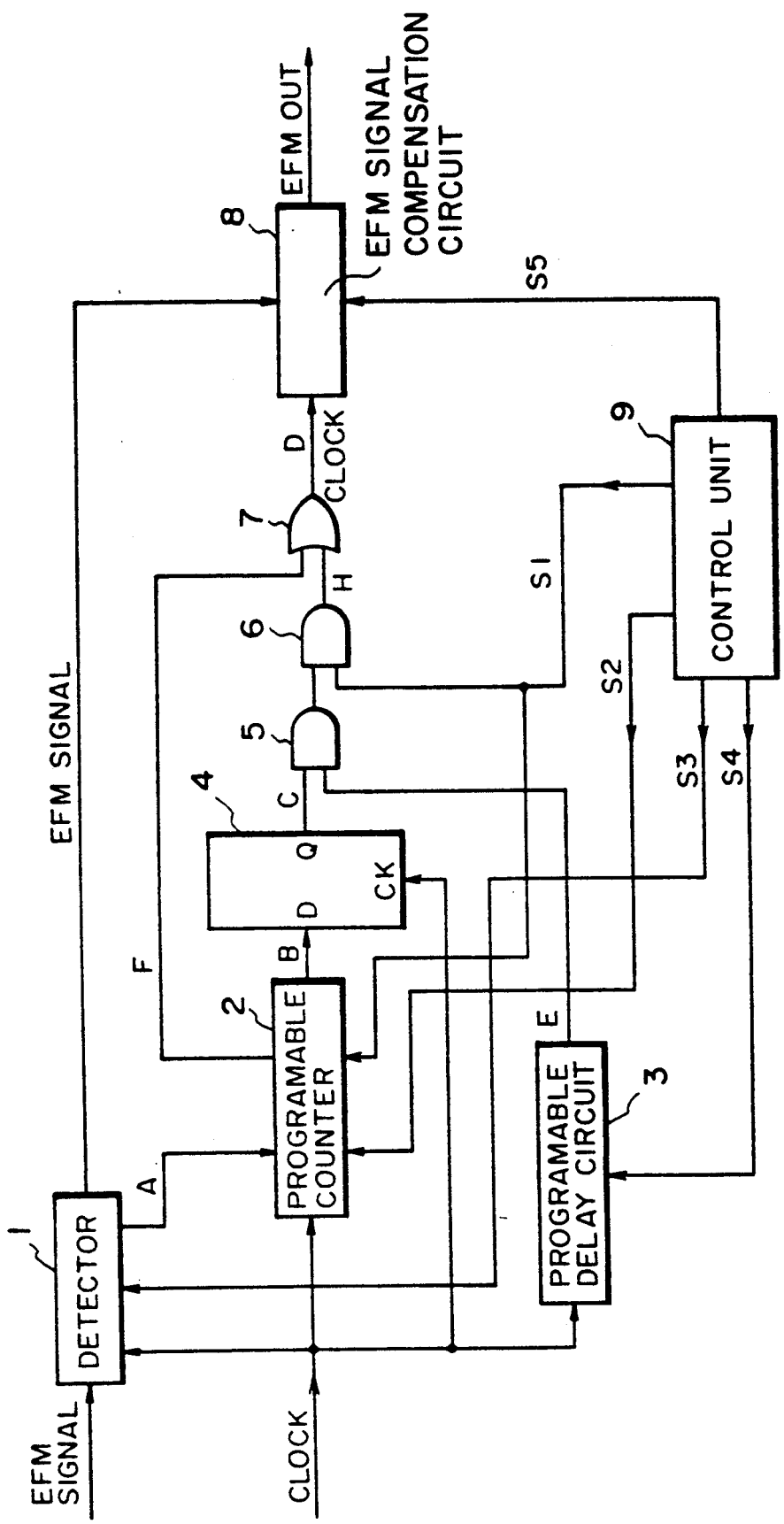
FIG. 1 is a block diagram showing the structure of an embodiment of a EFM compensation apparatus according to the present invention.

FIG. 1 is a block diagram showing an embodiment of the EFM compensation apparatus according to the present invention.

The EFM compensation apparatus of this embodiment is constructed of a detector 1, a programmable counter 2, a programmable delay circuit 3, a flip-flop 4, AND gates 5 and 6, an OR gate 7, a EFM compensation circuit 8, and a control unit 9.

Figure 2:
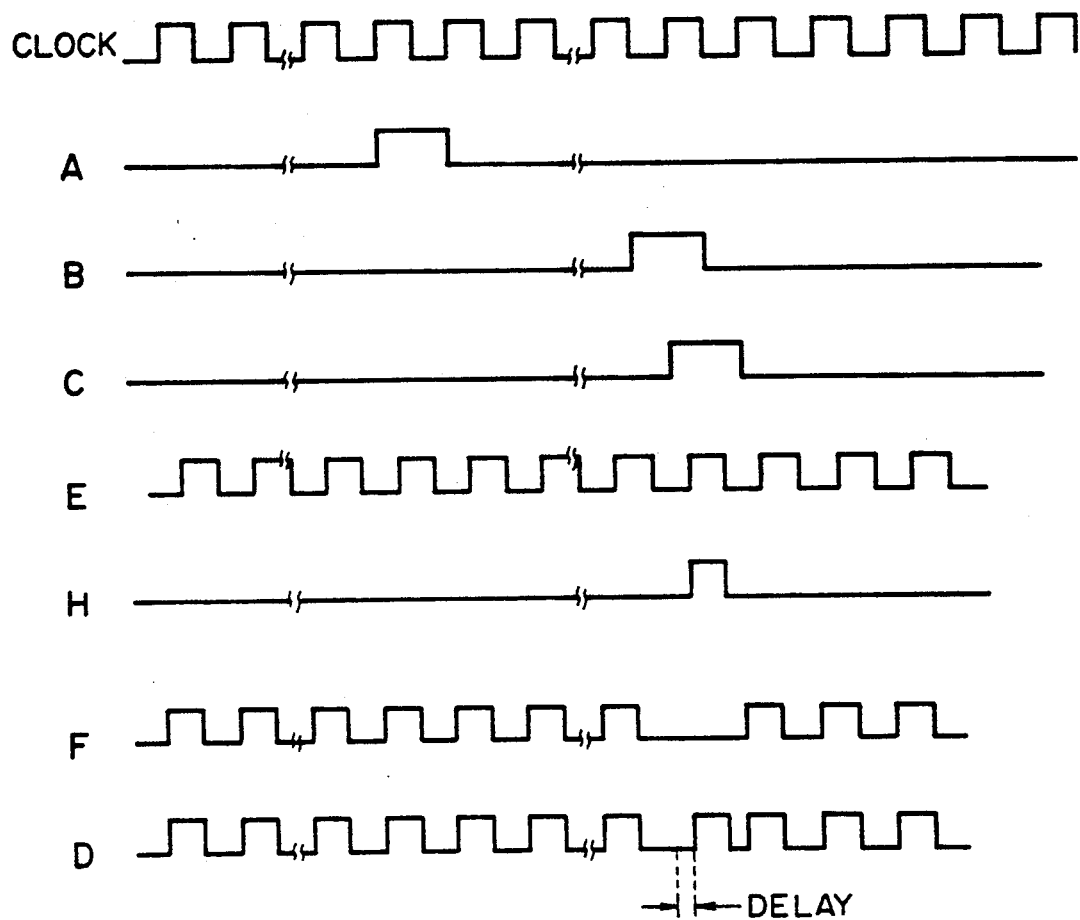
FIG. 2 is a timing chart of signals at various circuit portions, used for describing the operation of the embodiment shown in FIG. 1.

FIG. 2 shows the timings of signals at various circuit portions, used for explaining the operation of the apparatus shown in FIG. 1.

The operation of the EFM compensation apparatus shown in FIG. 1 will be described with reference to the timing chart shown in FIG. 2. First, the detector 1 detects predetermined particular data from an input EFM signal.

The detector 1 is constructed of, for example, a shift register and an AND gate. The shift register is formed a multiple stage cascade connection structure and has a plurality of output taps. The AND gate is inputted with an output from one of the taps and the input EMF signal. The detector 1 detector 1 detects particular data of a particular channel bit rate (e.g., 3T) designated by a control signal S3 from the control unit 9. The particular data detected by the detector 1 is outputted as an output signal A which is inputted to the programmable counter 2.

The programmable counter 2 compensates for a time delay caused by the detection operation of the detector 1. The programmable counter 2 sets a count corresponding to the time delay, in accordance with control signals S1 and S2. The control signal S1 takes a "HIGH" level when it is necessary to control the timing of the particular data, and takes a "LOW" level in the ordinary state. The control signal S2 identifies the set count of the programmable counter 2.

The programmable counter 2 supplies its input clock as a signal F directly to one input of the OR gate 7 when the control signal S1 is "LOW" level, and outputs a signal B if the control signal S1 is "HIGH" level and when the number of input clocks reaches the set count.

The programmable delay circuit 3 delays the timing of the input clock by a predetermined time period which is designated by a control signal S4 from the control unit 9. The predetermined time period is the period for delaying the particular data.

The output signal B from the programmable counter 2 is supplied to the flip-flop 4 whose output signal C is supplied to one input of the AND gate 5.

Supplied to the other input of the AND gate 5 is a clock signal E delayed by the programmable delay circuit 3. An AND output from the AND gate 5 is supplied to one input of the AND gate 6. Supplied to the other input of the AND gate 6 is the control signal S1 from the control unit 9.

An AND output from the AND gate 6 is supplied to the other input of the OR gate 7 whose output is inputted as a clock to a known EFM compensation circuit 8.

Figure 3:
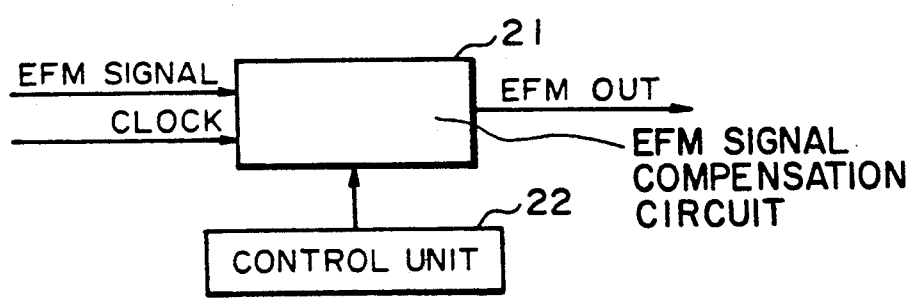
FIG. 3 is a block diagram showing an example of the structure of a conventional EFM compensation apparatus.

In response to the clock input, the EFM compensation circuit 8 delays the EMF signal outputted from the detector 1 by the predetermined time period. A control signal S5 supplied from the control unit 9 to the EFM compensation circuit 8 operates to delay the EMF signal by the predetermined time period in the manner similar to FIG. 3 and generates an output EFM signal. As above, the signal D shown in FIG. 2 is used for delaying only the particular EFM data by the predetermined time period.

While the programmable counter 2 does not generate the count signal B, the input clock is directly supplied to the OR gate 7 as the signal F. In response to an OR output, the EFM compensation circuit 8 controls the timings of all EFM signals from 3T to 11T uniformly.

When the output signal B is generated by the programmable counter 2, the clock signal F is not outputted, but the signal B is inputted to the flip-flop 4 which outputs one clock "HIGH" level signal. The programmable counter 2 operates synchronously with the output EFM signal from the detector 1. Therefore, in response to the clock supplied to the EFM compensation circuit, an EFM signal whose timing has been controlled as desired can be outputted.

The transmission frequency of the EFM signal is 4,3218 MHz. In this embodiment, clocks having a frequency of an integer multiple of 4.3218 MHz are used. If the symmetry is formed in fine pitches, clocks having a frequency of 4.3218 MHz may be used.

As described so far, according to the present invention, the timing of only a particular EFM data signal can be controlled for the record on an optical disk, thereby with new standards and improving the quality of reproduced signals. Furthermore, symmetry simulation becomes possible by applying the present invention to a CD encoder.

What is claimed is:

1. An EFM signal compensation apparatus comprising:
   a detector circuit for detecting particular data having a particular channel bit rate from an EFM signal:
   a first delay circuit for delaying a clock by a first time period corresponding to a detection time delay caused by said detector circuit;
   a second delay circuit for delaying said clock from said particular data by a predetermined second time period; and
   an EFM signal compensation circuit for controlling the timing of only said particular data by said second time period in accordance with output clocks from said first and second delay circuits.

* * * * *